(12) United States Patent
Simpson et al.

(10) Patent No.: US 8,190,125 B2
(45) Date of Patent: May 29, 2012

(54) METHODS, SYSTEMS, AND COMPUTER-READABLE MEDIA FOR DETECTING A MISSING CELLULAR DEVICE

(75) Inventors: Anita Hogans Simpson, Decatur, GA (US); Barbara Stark, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 952 days.

(21) Appl. No.: 11/856,287

(22) Filed: Sep. 17, 2007

(65) Prior Publication Data

US 2009/0075629 A1   Mar. 19, 2009

(51) Int. Cl.
*H04M 1/66* (2006.01)

(52) U.S. Cl. ............... 455/411; 455/550.1; 455/90.2

(58) Field of Classification Search .......... 455/406–419, 455/456.1–575.6
See application file for complete search history.

(56) References Cited

U.S. PATENT DOCUMENTS

| | | | |
|---|---|---|---|
| 4,675,656 A * | 6/1987 | Narcisse | 455/88 |
| 6,662,023 B1 * | 12/2003 | Helle | 455/558 |
| 6,983,169 B2 * | 1/2006 | Vogel et al. | 455/550.1 |
| 7,066,781 B2 * | 6/2006 | Weston | 446/268 |
| 7,474,747 B2 * | 1/2009 | Esquivia-Lee et al. | 379/433.02 |
| 2002/0058497 A1 * | 5/2002 | Jeong | 455/410 |
| 2003/0013449 A1 * | 1/2003 | Hose et al. | 455/440 |
| 2003/0148771 A1 * | 8/2003 | de Verteuil | 455/456 |
| 2006/0270361 A1 * | 11/2006 | Szymanski et al. | 455/90.2 |

* cited by examiner

*Primary Examiner* — Kent Chang
*Assistant Examiner* — Kashif Siddiqui
(74) *Attorney, Agent, or Firm* — Hope Baldauff Hartman, LLC

(57) ABSTRACT

Methods, systems, and computer-readable media provide for detecting a missing cellular device. According to embodiments, a method for detecting a missing cellular device is provided. According to the method, a connection between a cellular device and a base module is established. Whether a distance between the cellular device and the base module exceeds a distance threshold based on the connection is detected. In response to detecting that the distance between the cellular device and the base module exceeds the distance threshold, the cellular device is switched from an operational mode to a missing phone mode. The operational mode enables regular function of the cellular device. The missing phone mode restricts the regular function of the cellular device.

12 Claims, 4 Drawing Sheets

METHODS, SYSTEMS, AND COMPUTER-READABLE MEDIA FOR DETECTING A MISSING CELLULAR DEVICE

TECHNICAL FIELD

This application relates generally to the field of handheld devices. More specifically, the disclosure provided herein relates to the field of detecting missing cellular devices.

BACKGROUND

Cellular devices, such as cellular phones, smartphones, and personal digital assistants ("PDAs") have become pervasive in modern society. As cellular devices have become more popular, the incidences of missing cellular devices have also increased. Cellular devices may become missing because they are lost accidentally or stolen by a nefarious individual. In some cases, these cellular devices store personal information such as, contacts, email, pictures, and video. With access to the cellular device, the nefarious individual may be able to determine and steal the identity of the cellular device's owner.

When an owner of a cellular device reports the cellular device missing, a service provider may be able to suspend service on the missing cellular device. However, even with the service of the missing cellular device suspended, the nefarious individual can usually still access the personal information stored in the device. Further, the missing cellular device may still be useable by swapping the subscriber identity module ("SIM") card.

SUMMARY

Embodiments of the disclosure presented herein include methods, systems, and computer-readable media for detecting a missing cellular device. According to one aspect, a method for detecting a missing cellular device is provided. According to the method, a connection between a cellular device and a base module is established. Whether a distance between the cellular device and the base module exceeds a distance threshold based on the connection is detected. In response to detecting that the distance between the cellular device and the base module exceeds the distance threshold, the cellular device is switched from an operational mode to a missing phone mode. The operational mode enables regular function of the cellular device. The missing phone mode restricts the regular function of the cellular device.

According to another aspect, a system for detecting a missing cellular device is provided. The system includes a memory and a processor functionally coupled to the memory. The memory stores a program containing code for detecting a missing cellular device. The processor is responsive to computer-executable instructions contained in the program and operative to establish a connection between a cellular device and a base module, detect whether a distance between the cellular device and the base module exceeds a distance threshold based on the connection, and in response to detecting that the distance between the cellular device and the base module exceeds the distance threshold, switch the cellular device from an operational mode to a missing phone mode. The operational mode enables regular function of the cellular device. The missing phone mode restricts the regular function of the cellular device.

According to yet another aspect, a computer-readable medium having instructions stored thereon for execution by a processor to perform a method for detecting a missing cellular device is provided. According to the method, a connection between a cellular device and a base module is established. Whether a distance between the cellular device and the base module exceeds a distance threshold based on the connection is detected. In response to detecting that the distance between the cellular device and the base module exceeds the distance threshold, the cellular device is switched from an operational mode to a missing phone mode. The operational mode enables regular function of the cellular device. The missing phone mode restricts the regular function of the cellular device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for detecting and recovering a missing cellular device. In the following detailed description, references are made to the accompanying drawings that form a part hereof, and which are shown by way of illustration through specific embodiments or examples.

Embodiments described herein provide a cellular device configured to communicate with a proximal unit that is attached to or otherwise positioned near an authorized user of the cellular device. Since the proximal unit is positioned at or near the authorized user, the proximal unit effectively indicates the location of the authorized user. When the distance between the proximal unit and the cellular device is within a threshold range, a link between the cellular device and the proximal unit may be established. Through this link, a distance may be determined between the cellular device and the proximal unit. As long as the cellular device and the proximal unit are within the threshold range, the cellular device is not considered missing and is in an operational mode, according to exemplary embodiments. In the operational mode, the cellular device is fully functional. However, when the distance between the cellular device and the proximal unit exceeds the threshold range, the cellular device is considered missing and switches from the operational mode to a missing mode, according to exemplary embodiments. In the missing mode, the cellular device may have only limited functionality. For example, outgoing communications, such as voice calls and text messages, may be rerouted, and the resulting inbound communications may provide an informational message providing instructions regarding how to return the cellular device.

Figure 1:
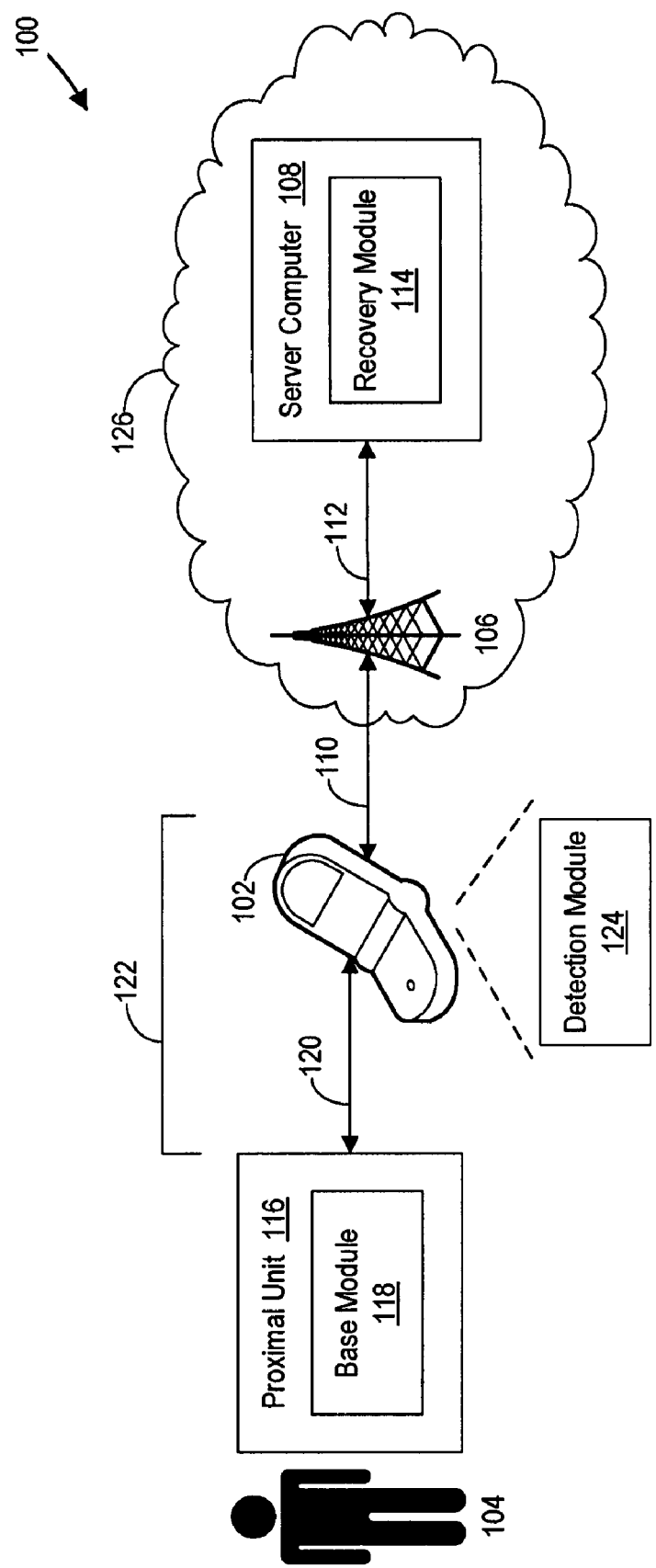
FIG. 1 is a high-level diagram illustrating an exemplary configuration of a cellular device, an authorized user of the cellular device, a cellular tower, and a server computer.

Referring now to the drawings, it is to be understood that like numerals represent like elements through the several figures, and that not all components and/or steps described and illustrated with reference to the figures are required for all embodiments. FIG. 1 is a high-level diagram illustrating an exemplary configuration 100 of a cellular device 102, an authorized user 104 of the cellular device 102, a cellular tower 106, and a server computer 108. The cellular tower 106 and the server computer 108 are included within wireless service provider 126. The cellular device 102 may include, but is not limited to, a cellular phone, a smartphone, a personal digital assistant ("PDA"), and a handheld gaming device. The cellular device 102 communicates with the cellular tower 106 via a radio link 110. The cellular tower 106 is operatively coupled to the server computer 108 via a network 112. In one embodiment, the server computer 108 includes a recovery module 114, which is described in greater detail below with respect to FIG. 2. The authorized user 104 may be any individual who is legally in possession of the cellular device 102.

As illustrated in FIG. 1, the authorized user 104 is associated with a proximal unit 116, which includes a base module 118. In exemplary embodiments, the proximal unit 116 is positioned to indicate the approximate location of the authorized user 104. If the proximal unit 116 is closer to the authorized user 104, then the proximal unit 116 more accurately indicates the location of the authorized user 104. Similarly, if the proximal unit 116 is farther from the authorized user 104, then the proximal unit 116 less accurately indicates the location of the authorized user 104. In one embodiment, the proximal unit 116 is an object that is attached to the authorized user 104. By attaching the proximal unit 116 to the authorized user 104, the proximal unit 116 can accurately indicate the location of the authorized user 104 even if the authorized user 104 moves. Examples of objects that can be associated with the proximal unit 116 and that may be attached to the authorized user 104 include, but are not limited to, a bracelet, a necklace, a charm, an earring, a watch, and a Bluetooth headset. In further embodiments, the proximal unit 116 is an object that is generally located near the authorized user 104. Examples of objects that can be associated with the proximal unit 116 and that are generally located near the authorized user 104 include, but are not limited to, a backpack, a gym bag, a handbag, and a holster configured to hold the cellular device 102.

According to exemplary embodiments, the base module 118, which is embodied within the proximal unit 116, establishes a baseline location from which to determine when the distance between the proximal unit 116 and the cellular device 102 has exceeded a threshold range 122. As illustrated in FIG. 1, the cellular device 102 includes a detection module 124. A wireless link 120 may be established between the cellular device 102 and the proximal unit 116. The wireless link 120 may be established using Bluetooth or other suitable wireless communication protocol. In one embodiment, the wireless link 120 is established by manually initiating the wireless functionality of the proximal unit 116 and/or the cellular device 102. Similarly, the wireless link 120 may be terminated by manually disabling the wireless functionality of the proximal unit 116 and/or the cellular device 102. In a further embodiment, the wireless link 120 is automatically established when the proximal unit 116 and the cellular device 102 are within the specified range of the wireless link 120. For example, class two Bluetooth devices typically have a range of about ten meters.

As previously mentioned, the wireless link 120 is utilized to determine whether the distance between the proximal unit 116 and the cellular device 102 exceeds the threshold range 122. In one embodiment, whether the distance between the proximal unit 116 and the cellular device 102 exceeds the threshold range 122 is determined based on the signal strength of the wireless link 120. For example, a stronger signal strength may indicate that the proximal unit 116 is near the cellular device 102 and within the threshold range 122. Similarly, a weak signal strength may indicate that the proximal unit 116 and the cellular device 102 are farther apart and outside the threshold range 122. The threshold range 122 may be defined by the manufacturer of the cellular device 102, by the manufacturer of the proximal unit 116, the service provider 126, and/or by the authorized user 104 via an option in the cellular device 102.

According to exemplary embodiments, the detection module 124 is configured to detect when the cellular device 102 exceeds the threshold range 122. In further embodiments, the base module 118 is configured to detect when the cellular device 102 exceeds the threshold range 122. Also, the detection module 124 and the base module 118 may be configured to manually check whether the cellular device 102 exceeds the threshold range 122 at the request of the authorized user 104. When the distance between the base module 118 and the detection module 124 is within the threshold range 122, as illustrated in FIG. 1, then it is presumed that the cellular device 102 is within the control of the authorized user 104. While the distance between the detection module 124 and the base module 118 is within the threshold range 122, the cellular device 102 is in an operational mode, in which the cellular device 102 is fully operational. In particular, the cellular device 102 may provide unrestricted access to data stored on the cellular device 102, including contacts, phone numbers, emails, text messages, voicemail messages, pictures, and video. Further, the service provider 126 may enable the cellular device 102 to initiate and receive phone calls, transmit and receive text messages, access the Internet, and transmit and receive any other communications.

Figure 2:
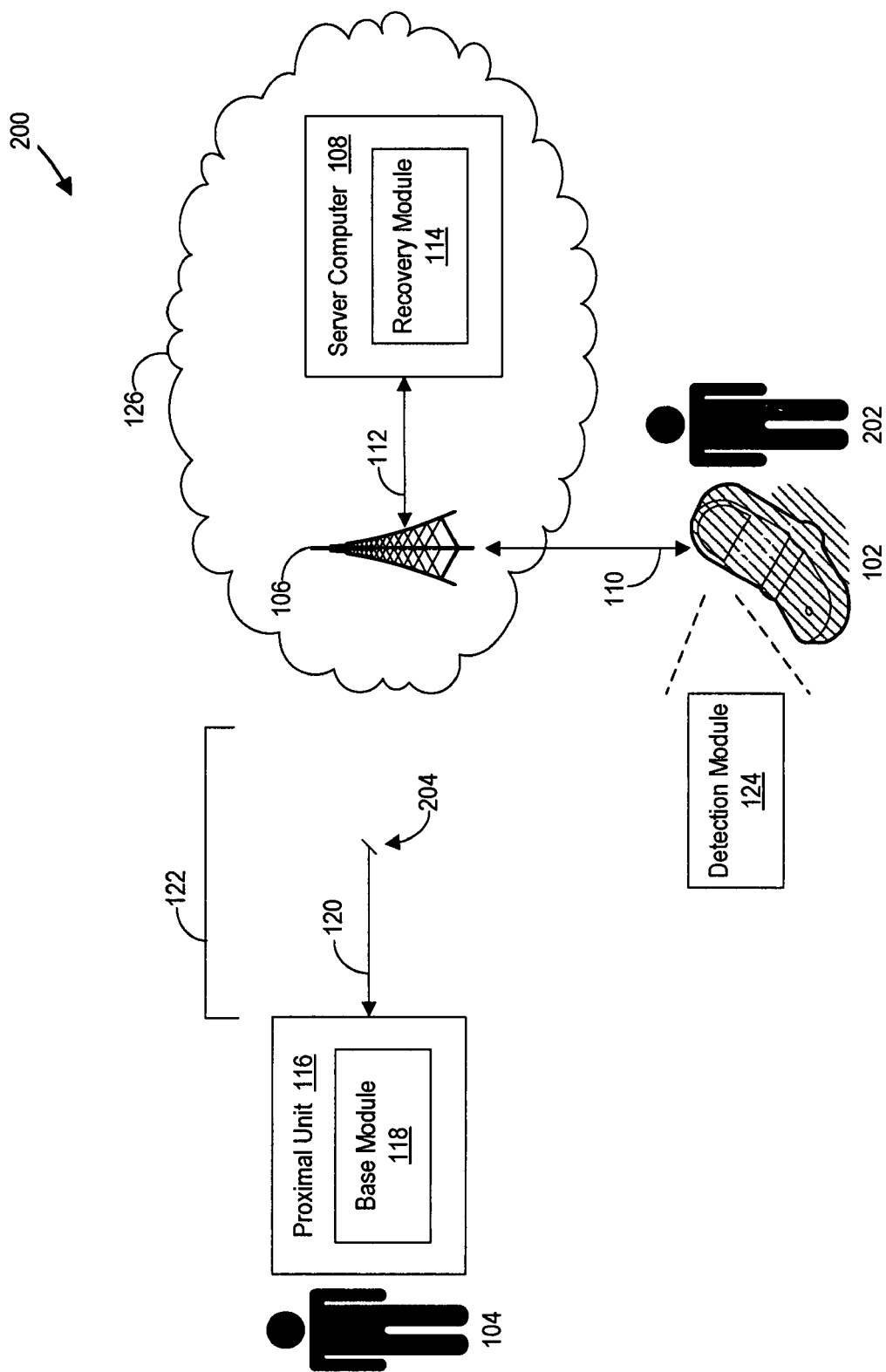
FIG. 2 is an exemplary configuration of the cellular device, the authorized user of the cellular device, the cellular tower, and the server computer after a thief obtains the cellular device.

When the distance between the base module 118 and the detection module 124 exceeds the threshold range 122, as illustrated in FIG. 2, then it is presumed that the cellular device 102 is not within the control of the authorized user 104. That is, the cellular device 102 is considered to be missing (i.e., lost or stolen). In response to determining that that the distance between the base module 118 and the detection module 124 exceeds the threshold range 122, the detection module 124 may switch the cellular device 102 from the operational mode to a missing mode, which limits the functionality of the cellular device 102 when it was in the operational mode.

FIG. 2 is an exemplary configuration 200 of the cellular device 102, the authorized user 104 of the cellular device 102, the cellular tower 106, and the server computer 108 after a thief 202 obtains the cellular device 102. As illustrated in FIG. 2, the distance between the proximal unit 116 and the cellular device 102 exceeds the threshold range 122. Further, the cellular device 102 has moved beyond the specified range of the wireless link 120. As a result, the wireless link 120 between the base module 118 and the detection module 124 is broken at 204. As described in greater detail below, in response to determining that the distance between the proximal unit 116 and the cellular device 102 exceeds the threshold range 122, a number of actions may be taken by the detection module 124 to alert the authorized user 104 that the cellular device 102 is missing, to restrict use of the cellular device 102, and to retrieve the cellular device 102.

Actions may be taken to alert the authorized user 104 that the cellular device 102 is missing. For example, in response to determining that the distance between the proximal unit 116 and the cellular device 102 exceeds the threshold range 122, the detection module 124 may sound (i.e., trigger) an alarm. The proximal unit 116 may also sound an alarm according to further embodiments. The alarm may serve to alert the authorized user 104 that the cellular device 102 is lost or that a theft of the cellular device 102 is in progress. The alarm may be accompanied by illumination (e.g., blinking lights) of the cellular device 102 or any other sensory event which is capable of alerting the authorized user 104 that the cellular device 102 is lost or being stolen.

Actions may be taken to restrict use of the cellular device 102 after determining that the distance between the proximal unit 116 and the cellular device 102 exceeds the threshold range 122. In one embodiment, in response to determining that the distance between the proximal unit 116 and the cellular device 102 exceeds the threshold range 122, the detection module 124 switches from the operational mode to the missing mode, as shown by the cross-hatching at the cellular device 102 of FIG. 2. The missing mode may be indicated on the display of the cellular device 102.

In a first embodiment, in response to determining that the distance between the proximal unit 116 and the cellular device 102 exceeds the threshold range 122, the detection module 124 automatically switches from the operational mode to the missing mode. In a second embodiment, the authorized user 104 contacts the service provider 126 to request that the cellular device 102 be switched to the missing mode. After the service provider 126 verifies the identity of the authorized user 104, the service provider 126 may utilize the recovery module 114 to transmit a signal to the detection module 124 to switch the cellular device 102 to the missing mode. In a third embodiment, the authorized user 104 directly communicates with the cellular device 102 to switch the cellular device 102 to the missing mode. The authorized user 104 may instruct the detection module 124 to switch from the operational mode to the missing mode by transmitting a dual-tone multi-frequency ("DTMF") code, a short message service ("SMS") message, an electronic mail, or other suitable transmission medium. In one embodiment, the detection module 124 includes a filter list that accepts Internet protocol ("IP") addresses, universal resource locators ("URLs"), caller identification ("ID") data, and sender identifiers.

If the wireless link 120 is mistakenly broken, the authorized user 104 may switch the missing mode back to the operational mode. In a first embodiment, the authorized user 104 switches the missing mode back to the operational mode by entering a password or personal identification number ("PIN"). For example, the password or PIN may be defined during the setup process for the cellular device 102. In a second embodiment, authorized user 104 may instruct the detection module 124 to switch from the missing mode back to the operational mode by transmitting a DTMF code, a SMS message, an electronic mail, or other suitable transmission medium. In a third embodiment, the authorized user 104 switches the missing mode back to the operational mode by contacting the service provider 126. After the service provider 126 verifies the identity of the authorized user 104, the service provider 126 may utilize the recovery module 114 to transmit a signal to the detection module 124 to switch the cellular device 102 back to the operational mode. In one embodiment, the cellular device 102 automatically switches back to the operational mode when the cellular device 102 and the proximal unit are within the threshold range 122.

Actions may be taken to retrieve the cellular device 102 after the wireless link 120 is broken. In one embodiment, the detection module 124 reroutes calls originating from the cellular device 102 to the recovery module 114 instead of connecting the calls to their intended destination. In response to receiving the rerouted calls, the recovery module 114 may play an audio announcement on the cellular device 102 indicating that the cellular device 102 is lost. In a further embodiment, the detection module 124 reroutes text messages originating from the cellular device 102 to the recovery module 114 instead of forwarding the text messages to their intended destination. In response to receiving the rerouted text messages, the recovery module 114 may transmit a text message to the cellular device 102 indicating the cellular device 102 is lost. The voice announcement and the text message may further include contact information of the service provider 126, instructions on how to return the cellular device 102, information regarding a reward for returning the cellular device 102, and any other information that may be used to return the cellular device 102 to the authorized user 104. In one embodiment, the exact location of the cellular device 102 may be determined via a global position system ("GPS") device (not shown) or other suitable location determining technology embodied within the cellular device 102. This location may be given to the police or other law enforcement if the cellular device 102 is stolen.

A common way a nefarious individual, such as the thief 202, attempts to gain access to a stolen cellular device, such as the cellular device 102, is to swap the subscriber identity module ("SIM") card inserted into the cellular device 102. The SIM card is generally a removable memory device that identifies a given user, such as the authorized user 104. To prevent the thief 202 from simply swapping the SIM card in the cellular device 102 to bypass the actions taken by the detection module 124 as described above, the detection module 124 may be associated with an irremovable or unerasable identification component (not shown) embodied within the cellular device 102. The identification component uniquely identifies the cellular device 102 irrespective of the authorized user 104, according to exemplary embodiments. In this case, the service provider 126 may associate the identification component with the authorized user 104. It should be appreciated that the identification component may be configured in a way so as to not prevent the authorized user 104 from legally selling the cellular device 102. For example, the service provider 126 may associate the identification component with the authorized user 104 only after the cellular device 102 is reported lost or stolen. The identification component may be comprised of hardware, firmware, software, or any combination thereof. Further, the component may be created by the manufacturer of the cellular device 102, the manufacturer of a software component, such as an operating system 314 as described in FIG. 3 below, of the cellular device 102, or the authorized user 104 during initialization of the cellular device 102. The cellular device 102 may also be configured such that removal or attempted removal of the identification component renders the cellular device 102 unusable.

Figure 3:
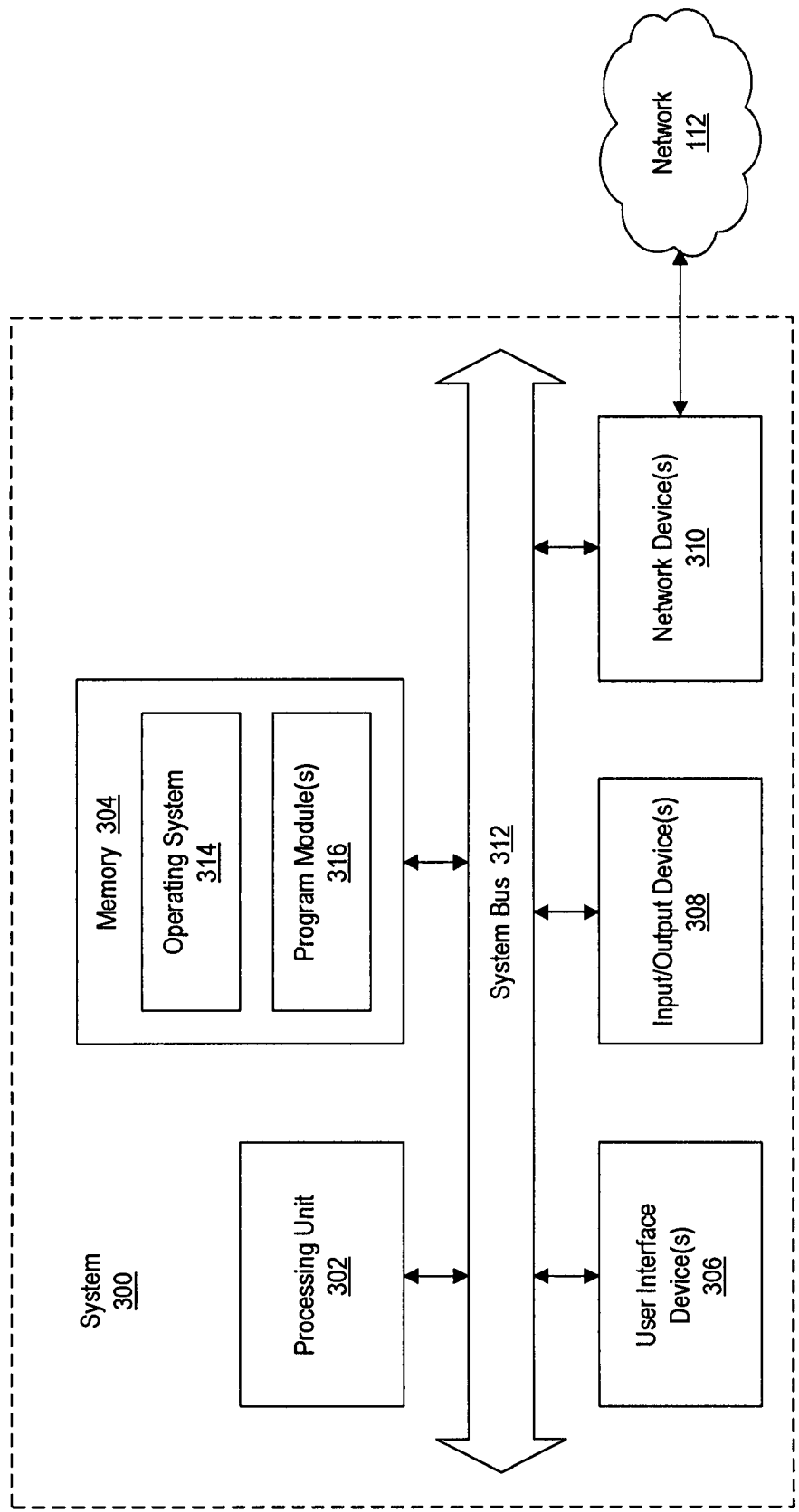
FIG. 3 is a block diagram illustrating the system configured to detect a missing cellular device, in accordance with exemplary embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300, in accordance with exemplary embodiments. Examples of the system 300 may include one or more of the cellular device 102, the server computer 108, and the proximal unit 116. The system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 314 and one or more program modules 316, according to exemplary embodiments. Examples of operating systems, such as the operating system 314, include, but are not limited to, WINDOWS operating system from MICROSOFT CORPORATION, LINUX operating system, and FREEBSD operating system. The program modules 316 may include one or more of the recovery module 114, the base module 118, and the detection module 124. In one embodiment, the detection module 124 is embodied in computer-readable media containing instructions that, when executed by the processing unit 302, performs a method for detecting a missing cellular device in conjunction with the base module 118, and the recovery module 114, as described in greater detail below with respect to FIG. 4. According to further embodiments, the detection module 124 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 300.

The user interface devices 306 may include one or more devices with which a user accesses the system 300. The user interface devices 306 may include, but are not limited to, desktop computers, laptop computers, servers, personal digital assistants, cellular phones, wireless gaming devices, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the system 300 to communicate with other networks or remote systems via a network, such as the network 112. Examples of network devices 310 may include, but are not limited to, a modem, a radio frequency ("RF") or infrared ("IR") transceiver, a telephonic interface, a bridge, a router, or a network card. The network 112 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 112 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
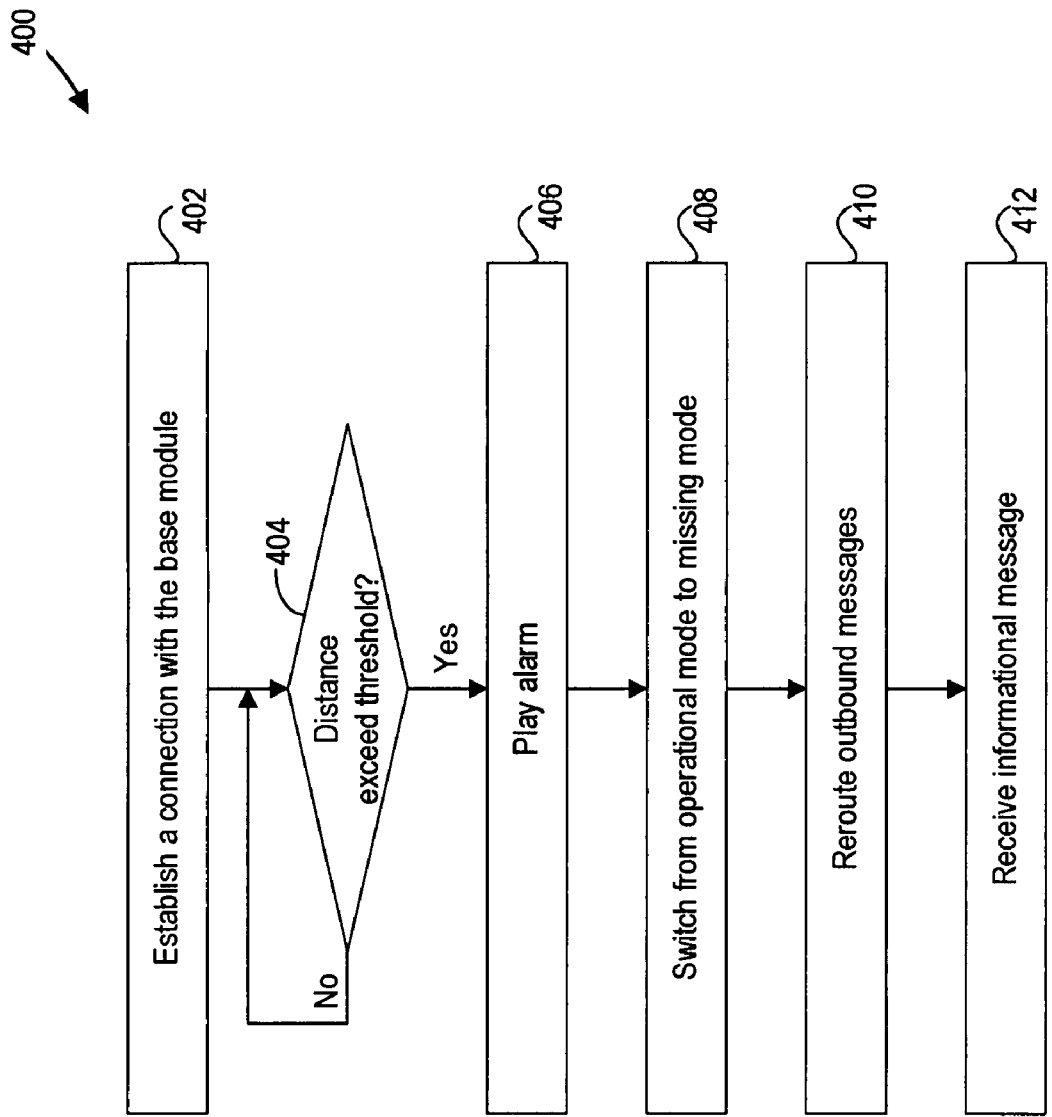
FIG. 4 is a flow diagram illustrating a method for reserving a cellular resource, in accordance with exemplary embodiments.

FIG. 4 is a flow diagram illustrating a method 400 for detecting a missing cellular device, in accordance with exemplary embodiments. According to the method 400, the detection module 124 of the cellular device 102 establishes (at 402) a connection with the base module 118. As previously mentioned, the base module 118 may be embodied within the proximal unit 116, which may be attached to or otherwise positioned near the authorized user 104. In one embodiment, the connection is automatically established when the distance between the detection module 124 and the base module 118 is within the specified range of the wireless link 120. In a further embodiment, the connection is manually established by the authorized user 104. While the detection module 124 and the cellular device 102 are connected, the cellular device 102 is in an operational mode, in which the cellular device 102 is fully operational.

The detection module 124 detects (at 404) whether the distance between the cellular device 102 and the base module 118 exceeds the threshold range 122. In one embodiment, whether the distance between the proximal unit 116 and the cellular device 102 exceeds the threshold range 122 is determined based on the signal strength of the wireless link 120. In response to the detection module 124 detecting that the distance between the cellular device 102 and the base module 118 is within the threshold range 122, the detection module 124 continues in the operational mode. In response to the detection module 124 detecting that the distance between the cellular device 102 and the base module 118 exceeds the threshold range 122, the detection module 124 plays (at 406) an alarm on the cellular device 102. The alarm may be useful to remind the authorized user 104 of the cellular device 102 if the authorized user 104 moves too far away from the cellular device 102. The alarm may also be useful to deter and identify thieves who attempt to steal the cellular device 102.

The detection module 124 switches (at 408) the cellular device 102 from the operational mode into the missing mode. As previously mentioned, the missing mode may cause the cellular device 102 to restrict the functionality of the cellular device 102. In a first embodiment, the detection module 124 automatically switches from the operational mode to the missing mode. In a second embodiment, the authorized user 104 contacts the service provider 126 to request that the cellular device 102 be switched to the missing mode. After the service provider 126 verifies the identity of the authorized user 104, the service provider 126 may utilize the recovery module 114 to transmit a signal to the detection module 124 to switch the cellular device 102 to the missing mode. In a third embodiment, the authorized user 104 directly communicates with the cellular device 102, via, for example, a DTMF code, a SMS message, or an electronic mail, to switch the cellular device 102 to the missing mode.

Once the cellular device 102 is switched into the missing mode, the detection module 124 reroutes (at 410) any communications initiating from the cellular device 102 to the recovery module 114. Exemplary communications that may be rerouted include, but are not limited to, voice calls, text messages, picture transmissions, and video transmissions. By rerouting the communications to the recovery module 114, the outbound communications do not reach their intended destinations. After the detection module 124 reroutes the communications to the recovery module 114, the detection module 124 receives (at 412) an informational communication, which may be output to the cellular device 102. The informational communication may be in any suitable multimedia format, including text, pictures, audio, and video. The informational communication may include information on contact information of the service provider 126, instructions on how to return the cellular device 102, and information regarding a reward for returning the cellular device 102.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for detecting a missing handheld, cellular device, comprising:
   establishing a connection between a handheld cellular device and a portable base module, the portable base module comprising an object attached to a user of the handheld cellular device;
   detecting whether a distance between the handheld cellular device and the portable base module exceeds a distance threshold based on the connection;
   in response to detecting that the distance between the handheld cellular device and the portable base module exceeds the distance threshold, switching the handheld cellular device from an operational mode to a missing phone mode, the operational mode enabling regular function of the handheld cellular device, and the missing phone mode restricting the regular function of the handheld cellular device;
   in response to detecting that the distance between the handheld cellular device and the portable base module exceeds the distance threshold, triggering an audible alarm through the portable base module;
   in response to detecting that the distance between the handheld cellular device and the portable base module exceeds the distance threshold, triggering a second audible alarm on the handheld cellular device;
   rerouting, by way of a cellular network, communications initiated from he handheld cellular device to a remote service provider, the communications originally intended for a recipient;
   upon rerouting the communications initiated from the handheld cellular device to the remote service provider, receiving, by way of the cellular network, an informational communication from the remote service provider; and
   outputting the informational communication on the handheld cellular device, the informational communication including instructions for returning the handheld cellular device to the remote service provider.

2. The method of claim 1, wherein switching the handheld cellular device from an operational mode to a missing phone mode comprises switching the handheld cellular device from the operational mode to the missing phone mode in response to receiving, by way of a cellular network, an instruction from the remote service provider to switch the handheld cellular device from the operational mode to the missing phone mode.

3. The method of claim 1, wherein switching the handheld cellular device from an operational mode to a missing phone mode comprises switching the handheld cellular device from the operational mode to the missing phone mode in response to receiving at least one of a dual-tone multi-frequency (DTMF) code, a short message service (SMS) message, an electronic mail message, and a sender identifier.

4. The method of claim 1, wherein detecting whether a distance between the handheld cellular device and the portable base module exceeds a distance threshold based on the connection comprises determining whether a signal strength of the connection between the handheld cellular device and the portable base module has decreased below a signal threshold.

5. A system for detecting a missing handheld cellular device, comprising:
   a memory for storing a program containing code for detecting a missing handheld cellular device;
   a processor functionally coupled to the memory, the processor being responsive to computer-executable instructions contained in the program and operative to:
      establish a connection between a handheld cellular device and a portable base module, the portable base module comprising an object attached to a user of the handheld cellular device,
      detect whether a distance between the handheld cellular device and the portable base module exceeds a distance threshold based on the connection,
      in response to detecting that the distance between the handheld cellular device and the portable base module exceeds the distance threshold, switch the handheld cellular device from an operational mode to a missing phone mode, the operational mode enabling regular function of the handheld cellular device, and the missing phone mode restricting the regular function of the handheld cellular device, in response to detecting that the distance between the handheld cellular device and the portable base module exceeds the distance threshold, trigger an audible alarm through the portable base module, in response to detecting that the distance between the handheld cellular device and the portable base module exceeds the distance threshold, trigger a second audible alarm on the handheld cellular device, reroute, b way of a cellular network, communications initiated from the handheld cellular device to a remote service provider, the communications originally intended for a recipient, upon rerouting the communications initiated from the handheld cellular device to the remote service provider, receive, by way of the cellular network, an informational communication from the remote service provider, and output the informational communication on the handheld cellular device, the informational communication including instructions for returning the handheld cellular device to the remote service provider.

6. The system of claim 5, wherein to switch the handheld cellular device from an operational mode to a missing phone mode, the processor is operative to switch the handheld cellular device from the operational mode to the missing phone mode in response to receiving, by way of a cellular network, an instruction from the remote service provider to switch the handheld cellular device from the operational mode to the missing phone mode.

7. The system of claim 5, wherein to switch the handheld cellular device from an operational mode to a missing phone mode, the processor is operative to switch the handheld cellular device from the operational mode to the missing phone mode in response to receiving at least one of a dual-tone multi-frequency (DTMF) code, a short message service (SMS) message, an electronic mail message, and a sender identifier.

8. A computer-readable medium having instructions stored thereon for execution by a processor to provide a method for detecting a missing handheld cellular device, the method comprising:

establishing a connection between a handheld cellular device and a portable base module, the portable base module comprising an object attached to a user of the handheld cellular device;

detecting whether a distance between the handheld cellular device and the portable base module exceeds a distance threshold based on the connection;

in response to detecting that the distance between the handheld cellular device and the portable base module exceeds the distance threshold, switching the handheld cellular device from an operational mode to a missing phone mode, the operational mode enabling regular function of the handheld cellular device, and the missing phone mode restricting the regular function of the handheld cellular device;

in response to detecting that the distance between the handheld cellular device and the portable base module exceeds the distance threshold, triggering an audible alarm through the portable base module;

in response to detecting that the distance between the handheld cellular device and the portable base module exceeds the distance threshold, triggering a second audible alarm on the handheld cellular device;

rerouting, by way of a cellular network, communications initiated from the handheld cellular device to a remote service provider, the communications originally intended for a recipient;

upon rerouting the communications initiated from the handheld cellular device to the remote service provider, receiving, by way of the cellular network, an informational communication from the remote service provider; and outputting the informational communication on the handheld cellular device, the informational communication including instructions for returning the handheld cellular device to the remote service provider.

9. The computer-readable medium of claim 8, wherein switching the handheld cellular device from an operational mode to a missing phone mode comprises switching the handheld cellular device from the operational mode to the missing phone mode in response to receiving, by way of a cellular network, an instruction from the remote service provider to switch the handheld cellular device from the operational mode to the missing phone mode.

10. The computer-readable medium of claim 8, wherein switching the handheld cellular device from an operational mode to a missing phone mode comprises switching the handheld cellular device from the operational mode to the missing phone mode in response to receiving at least one of a dual-tone multi-frequency (DTMF) code, a short message service (SMS) message, an electronic mail message, and a sender identifier.

11. The computer-readable medium of claim 8, wherein detecting whether a distance between the handheld cellular device and the portable base module exceeds a distance threshold based on the connection comprises determining whether a signal strength of the connection between the handheld cellular device and the portable base module has decreased below a signal threshold.

12. The computer-implemented method of claim 1, wherein the portable base module comprises a jewelry item worn by the user; and wherein triggering an audible alarm through the portable base module comprises triggering the audible alarm through the jewelry item worn by the user.

* * * * *

UNITED STATES PATENT AND TRADEMARK OFFICE
CERTIFICATE OF CORRECTION

| | | |
|---|---|---|
| PATENT NO. | : 8,190,125 B2 | Page 1 of 1 |
| APPLICATION NO. | : 11/856287 | |
| DATED | : May 29, 2012 | |
| INVENTOR(S) | : Anita Hogans Simpson and Barbara Stark | |

It is certified that error appears in the above-identified patent and that said Letters Patent is hereby corrected as shown below:

In Claim 1, Column 9, Line 54, please delete "," after the word "handheld".

In Claim 17, Column 10, Line 13, after the word "from" please delete "he" and replace with --the--.

Signed and Sealed this
Seventeenth Day of July, 2012

David J. Kappos
*Director of the United States Patent and Trademark Office*